No. 12,560. REISSUED NOV. 20, 1906.
W. M. DAVIS.
TELEPHONE EXCHANGE SYSTEM.
APPLICATION FILED OCT. 30, 1903.
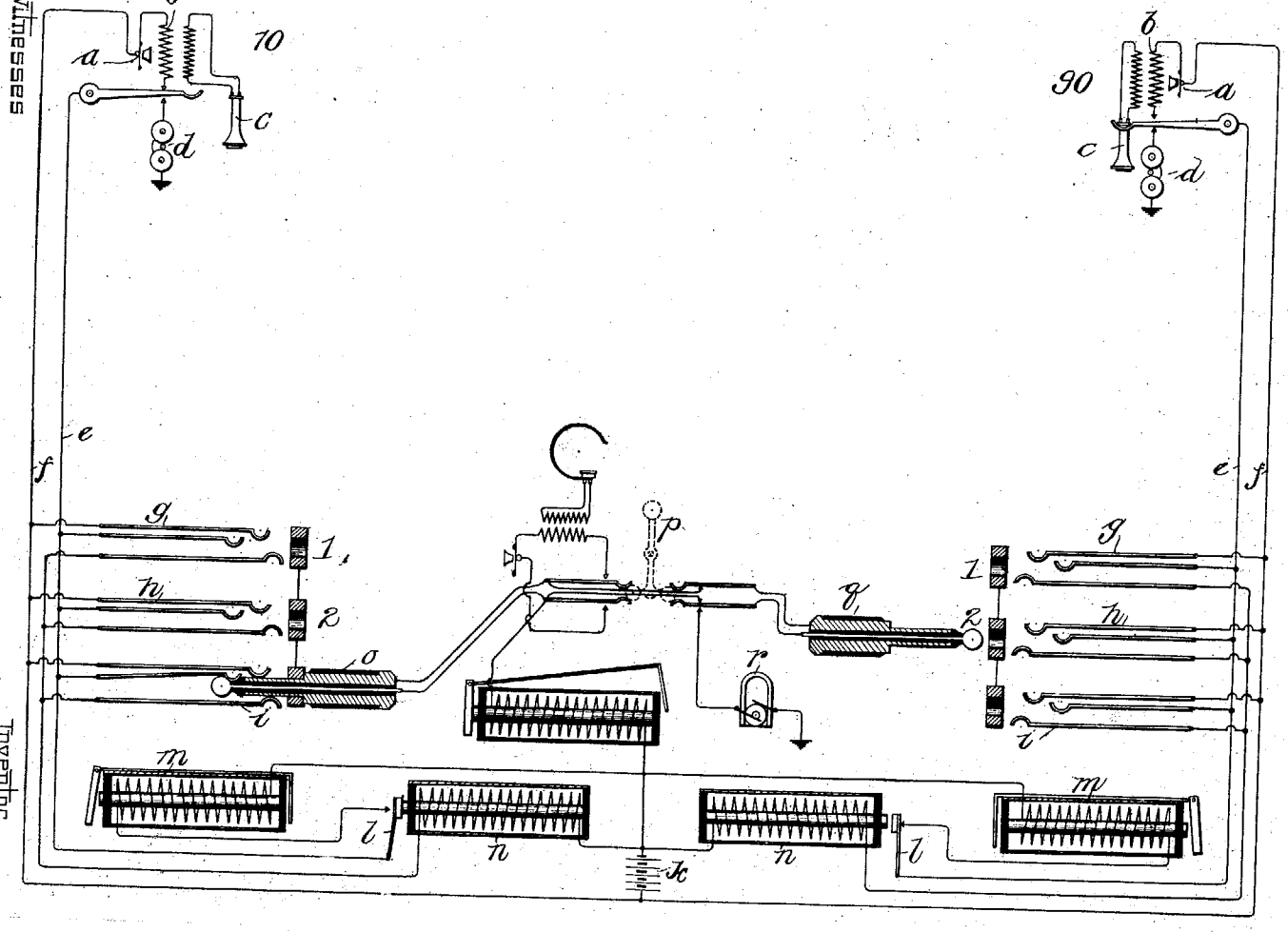
Witnesses
Leonard W. Novander
Charles J. Schmidt
Inventor
William M. Davis
By Charles A. Brown
Attorney

UNITED STATES PATENT OFFICE.

WILLIAM M. DAVIS, OF SEATTLE, WASHINGTON, ASSIGNOR, BY MESNE ASSIGNMENTS, TO STROMBERG-CARLSON TELEPHONE MANUFACTURING COMPANY, OF ROCHESTER, NEW YORK, A CORPORATION OF NEW YORK.

TELEPHONE-EXCHANGE SYSTEM.

No. 12,560. Specification of Reissued Letters Patent. Reissued Nov. 20, 1906.

Original No. 679,731, dated August 6, 1901. Application for reissue filed October 30, 1903. Serial No. 179,243.

*To all whom it may concern:*

Be it known that I, WILLIAM M. DAVIS, a citizen of the United States, residing at Seattle, in the county of King, State of Washington, have invented a certain new and useful Improvement in Telephone-Exchange Systems, of which the following is a full, clear, concise, and exact description, reference being had to the accompanying drawing, forming a part of this specification.

My invention relates to telephone-exchange systems, and more particularly to that class of telephone-exchange systems where line-relays are employed for controlling circuit through line-indicators; and my invention has for its object the provision of improved means for controlling the circuits through the line-relays.

Heretofore local circuits have been controlled totally independent of the line conductors, which included the line-relays, these circuits being closed upon the insertion of the connecting-plugs within the spring-jacks, thereby causing an actuation of the relays, and thereby the exclusion of line-indicators from circuit with other telephone-lines. In practicing my invention I employ line conductors for the relay-circuits, the plugs serving to include these conductors in circuit with the line-relays upon their insertion within spring-jacks, the same battery that is employed for actuating the line-indicators being also preferably employed in the operation of the relays.

In the preferred embodiment of my invention I provide a supplemental contact in connection with each spring-jack, which in cooperation with a plug inserted within the spring-jack serves to direct current from the common battery through the telephone-line and through the line-relay, the armature of the relay thereby being attracted, then serving to separate two contacts included serially in the line-indicator circuit.

I will explain my invention more particularly by reference to the accompanying drawing, which illustrates a metallic-circuit multiple-switchboard system equipped in accordance with my invention.

The apparatus at the substations 10 and 90 is well known to those skilled in the art. A battery-transmitter *a*, with its coil *b* and receiver *c*, is illustrated at each of these stations, a secondary coil at each station in this particular instance being included in a local or short circuit with the telephone-receiver thereat, while the primary coil in circuit with the transmitter is placed in circuit with both limbs of the corresponding telephone-line upon the removal of the receiver from its spring switch-hook. The transmitter primary winding of the induction-coil at station 10 is thus shown in series with the telephone-line, the telephone-receiver at this station being removed from its hook. The transmitter-circuit at station 90 is open, the receiver at said station being upon its hook. I do not, however, wish to be limited to the precise arrangement of the telephone apparatus at the subscribers' stations that I have shown. There is also provided at each station a call-bell *d*, preferably responsive to alternating current, which is included in a grounded branch that is closed when the telephone-receiver at that station is upon its hook. The metallic-circuit telephone-lines extend from the substations to an exchange. The limbs *e* and *f* of each metallic line extend to spring-jacks *g* and *h* upon sections 1 and 2 of the multiple switchboard and are also connected with an answering-jack *i* at section 2. A common battery *k* is preferably connected in bridge between the sides of the telephone-lines. The limb *e* of each line terminates in a spring-lever *l*, normally resting against a contact constituting a terminal of a line-indicator *m*, the other terminal of the line-indicator being connected with one terminal of the common battery, the remaining terminal of the common battery being preferably permanently connected with the limb *f* of each line. A subscriber in initiating a call closes the circuit of the battery *k* through the line-indicator and the spring-lever *l*, normally in circuit therewith. A relay *n* is associated with each line-indicator. One terminal of this relay is connected with one terminal of the battery *k*. The remaining terminal of each relay is in this particular instance connected with the longest line-spring of each jack for the purpose hereinafter to be set forth. Each line-jack employs three contact-springs, the shortest being adapted for engagement with the tips of the inserted plugs, while the two remaining springs are both adapted for electrical contact with the same sleeve. The short line-spring of each jack is connected with one side of each telephone-line, the spring of intermediate length is connected with the other side of the telephone-line, while the longest line-springs of the jacks associated with each line are directly connected together and are normally disconnected from the said line. A plug is thus adapted by uniting the two longer line-springs of a jack to connect one terminal of a relay *n* with one side of a telephone-line, and as the other terminal of each relay is permanently connected with the other side of the telephone-line the relay is at once energized upon the insertion of a plug, being preferably included in a local circuit at the exchange.

Assuming that subscriber No. 10 wishes telephonic communication with subscriber No. 90, the calling subscriber by removing his telephone from its hook operates his line-indicator. The operator in response to this signal inserts the answering-plug *o* within the answering-jack of the calling subscriber and by a proper manipulation of her key *p* includes her telephone in circuit with the calling subscriber. Ascertaining that this subscriber desires communication with subscriber No. 90, she inserts the connecting-plug *q* within the line-jack of the called subscriber and by means of the key *p* includes the generator *r* in circuit with the grounded signal-bell *d* at the called-subscriber's station. I preferably include a clearing-out indicator in circuit with the battery between a side of the telephone-circuit and a cord strand, as indicated. Immediately upon the insertion of the plugs within the jacks, as has been explained, line-relays *n* are energized and the spring-levers *l*, carrying armatures for these relays, are attracted toward the relays, whereby they are disconnected from normal contacts constituting terminals of the line-indicators, the indicators thus being cut out of circuit. Thus simply by the addition of an extra contact-spring in connection with each jack I am enabled to dispense with the special local circuit heretofore commonly employed in the control of the line-relays.

While I have herein shown and particularly described the preferred embodiment of my invention, I do not wish to be limited to the precise construction shown, as modifications may be made without departing from the spirit of my invention; but,

Having thus described my invention, I claim as new and desire to secure by Letters Patent—

1. In a telephone-exchange system, the combination with a telephone-line extending from a substation to an exchange, a telephone switch-hook being provided at the substation for supporting a receiver and adapted upon the removal of the receiver to connect the sides of the telephone-circuit together, of a line-indicator, a common battery adapted to be included in circuit with the line-indicator upon the removal of the receiver at the substation from its telephone switch-hook, a relay controlling the circuit through the line-indicator, a line-jack for the said telephone-line having three contact-terminals, and a plug constituting a part of a line-connecting apparatus having two contact parts, one of the said contact parts being adapted for engagement with two of the terminal contacts of the jack, the latter terminals of the jack being connected respectively with one terminal of the relay and one side of the telephone-circuit, the other terminal of the relay being connected with one terminal of the battery whose other terminal is connected with the aforesaid side of the telephone-line, the said plug upon its insertion thereby being adapted to effect the operaton of the relay and thereby the restoration of the line-indicator, substantially as described.

2. In a telephone-exchange system, the combination with a telephone-line extending from a substation to an exchange, a telephone switch-hook being provided at the substation for supporting a receiver, and adapted upon the removal of the receiver to connect the sides of the telephone-circuit together, of a line-indicator, a common battery adapted to be included in circuit with the line-indicator upon the removal of the receiver at the substation from its telephone switch-hook, a relay controlling the circuit through the line-indicator, a jack connected with the telephone-line, provided with a plurality of spring-contacts, connecting apparatus employing a plug adapted for insertion within the jack, the said plug coöperating with the said jack upon the insertion of the plug, to short-circuit two of the said spring-contacts, thereby to direct current from the common battery through the said relay, and a portion of the telephone-line, substantially as described.

3. In a telephone-exchange system, the combination with a telephone-line extending from a substation to an exchange, a telephone switch-hook being provided at the substation for supporting a receiver and adapted upon the removal of the receiver to connect the sides of the telephone-circuit together, of a line-indicator, a common battery adapted to be included in circuit with the line-indicator upon the removal of the receiver at the substation from its telephone switch-hook, a relay controlling the circuit through the line-indicator, a jack provided with a plurality of spring-contacts, two of said contacts being connected with the two sides of said telephone-line, the remaining spring-contact being connected with one terminal of said relay, connecting apparatus employing a plug adapted for insertion within the jack, the said plug and jack coöperating upon the insertion of the plug to electrically connect the said spring-contact connected to the said relay with one of the said spring-contacts connected to one side of the telephone-line, thereby to direct current from the common battery through the said relay, and a portion of the telephone-line, substantially as described.

4. In a telephone-exchange system, the combination with a telephone-line extending from a substation to a central exchange, of a source of current at the exchange for supplying talking and signaling current to the line, a line-indicator adapted to be connected in circuit with the source of current, normally controlled upon actuation of substation apparatus, spring-jacks at the central exchange having contacts connected with the line-limbs, a cord-circuit at the central exchange, a cut-off relay at the central exchange in a local circuit including said source of current, and an auxiliary contact-spring associated with said jack-springs, insertion of a cord-circuit plug into the spring-jack causing connection between said auxiliary contact and one of said line-jack springs to close the circuit through said cut-off relay whereby the indicating-signal is rendered inert.

5. In a telephone-exchange system, the combination with a telephone-line extending from a substation to a central exchange, of a source of current at the exchange for supplying talking and signaling current to the line, a line-indicator adapted to be included in circuit with said source of current normally controlled upon actuation of substation apparatus, spring-jacks at the central exchange having contacts connected with the line-limbs, a cord-circuit at the central exchange, a cut-off relay at the central exchange in a local circuit including said source of current, and two normally disconnected spring-jack contacts, insertion of a cord-circuit plug into the spring-jack causing short-circuiting of said local circuit-contacts to close the circuit through said cut-off relay whereby the indicating-signal is rendered inert, said local circuit including a portion of the telephone line-limb.

6. In a telephone-exchange system, the combination with a telephone-line extending from a substation to an exchange, of source of current at the exchange, a spring-jack at the exchange having contacts connected with the line-limbs, a cord-circuit at the exchange, a line-indicator at the exchange connected with the source of current and with the line-limbs and controlled upon actuation of substation apparatus to display a signal, a cut-off relay at the central exchange, switch mechanism controlled by the cut-off relay, a local circuit including said cut-off relay, said source of current and a line spring-jack contact and an auxiliary contact associated with said line spring-jack contact but normally disconnected therefrom, whereby the switching mechanism of the cut-off relay is normally inert to complete the circuit of the line-indicator upon actuation of substation apparatus, and means upon insertion of a plug of the cord-circuit in said spring-jack for causing short-circuiting of said line spring-jack contact and said auxiliary contact whereby the cut-off relay is energized to break the line-indicator circuit.

7. In a telephone-exchange system, the combination with a telephone-line extending from a substation to an exchange, of a spring-jack at the exchange having contacts connected with the line-limbs, a common source of current at the exchange for supplying talking and signaling current to line, a cord-circuit at the exchange, a line-indicator at the exchange adapted to be included in circuit with said source of current and with the line-limbs and controlled upon actuation of substation apparatus to display a signal, a cut-off relay at the central exchange, switch mechanism controlled by the cut-off relay, a local circuit including said cut-off relay, said source of current and two normally disconnected spring-jack contacts whereby the switching mechanism of the cut-off relay is normally inert to complete the circuit of the line-indicator upon actuation of substation apparatus, and means upon insertion of a plug of the cord-circuit in said spring-jack for causing short-circuiting of said two local-circuit contacts whereby the cut-off relay is energized to break the line-indicator circuit, said local circuit including a portion of the telephone-circuit.

In witness whereof I hereunto subscribe my name this 14th day of October, A. D. 1903.

WILLIAM M. DAVIS.

Witnesses:
F. E. REICHARDT,
A. C. THOLSTRUP.